(12) United States Patent  
Ogawa (10) Patent No.: US 8,159,101 B2  
(45) Date of Patent: Apr. 17, 2012

(54) DRIVING FORCE TRANSMISSION MECHANISM, IMAGE FORMING APPARATUS AND ASSEMBLING METHOD THEREOF WITH A PLATE WITH A REFERENCE HOLE

(75) Inventor: Daisuke Ogawa, Nagoya (JP)

(73) Assignee: Brother Kogyo Kabushiki Kaisha, Nagoya-shi (JP)

( * ) Notice: Subject to any disclaimer, the term of this patent is extended or adjusted under 35 U.S.C. 154(b) by 94 days.

(21) Appl. No.: 12/133,748

(22) Filed: Jun. 5, 2008

(65) Prior Publication Data

US 2008/0303364 A1  Dec. 11, 2008

(30) Foreign Application Priority Data

Jun. 6, 2007  (JP) .................................. 2007-150256

(51) Int. Cl.
*H02K 7/116* (2006.01)
*H02K 7/10* (2006.01)
*H02K 5/26* (2006.01)

(52) U.S. Cl. ............. 310/80; 310/75 R; 310/83; 310/91; 310/96; 310/99

(58) Field of Classification Search ............ 310/80, 310/75 R, 83, 91, 96, 99, 98; *H02K 7/10, H02K 5/00, 5/26*
See application file for complete search history.

(56) References Cited

U.S. PATENT DOCUMENTS

| 4,033,531 | A | * | 7/1977 | Levine | 310/91 |
| 4,700,095 | A | * | 10/1987 | Kawakami | 310/91 |
| 5,528,343 | A | * | 6/1996 | Tada et al. | 310/83 |
| 5,634,178 | A | * | 5/1997 | Sugiura et al. | 399/110 |
| 2006/0263114 | A1 | * | 11/2006 | Ogawa | 399/167 |

FOREIGN PATENT DOCUMENTS

| JP | 02-140059 | 11/1990 |
| JP | 05-306740 | 11/1993 |
| JP | 05-307284 | 11/1993 |
| JP | 06-314001 | 11/1994 |
| JP | 08-101552 | 4/1996 |
| JP | 08101552 A * | 4/1996 |

* cited by examiner

*Primary Examiner* — Quyen Leung
*Assistant Examiner* — Michael Andrews
(74) *Attorney, Agent, or Firm* — Banner & Witcoff, Ltd.

(57) ABSTRACT

To provide a driving force transmission mechanism in which the thickness can be reduced as well as the positioning between a driven shaft, a driven structure, and a motor shaft of a motor is easy. The driving force transmission mechanism as disclosed includes a plate through which a reference hole is pierced, a driven shaft vertically standing with respect to an inner surface on the side of the inner surface of the plate, a driven gear pivotally provided around the driven shaft, a bracket fixed to the plate so as to cover the reference hole on the side of the inner surface of the plate, and a stepping motor protruding a motor shaft toward the reference hole, being fixed to the bracket. The motor shaft is positioned through the reference hole with driving teeth formed at the motor shaft to be directly engaged with the driven gear.

17 Claims, 8 Drawing Sheets

DRIVING FORCE TRANSMISSION MECHANISM, IMAGE FORMING APPARATUS AND ASSEMBLING METHOD THEREOF WITH A PLATE WITH A REFERENCE HOLE

CROSS-REFERENCE TO RELATED APPLICATION

The present application claims the benefit of Japanese patent application No. 2007-150256 filed on Jun. 6, 2007, and the contents of the application are cited and incorporated herein.

BACKGROUND OF THE INVENTION

As a driving force transmission mechanism in which a driven shaft is fixed to a plate, a driven structure is pivotally provided around the driven shaft as well as a motor is fixed to the plate, there are two types of mechanisms. In the driving force transmission mechanism of the first type, a driven shaft and a driven structure are at a first side surface of the plate, while a motor is at the other surface side of the plate. In the driving force transmission mechanism of the second type, a driven shaft, a driven structure and a motor are at a first side surface of the plate. As a specific example of the latter case, the one described in JP-A-5-306740 is known.

In these driving force transmission mechanisms, when a motor shaft of the motor rotates, the driving force is transmitted to the driven structure. The driving force of the driven structure is transmitted to other components. Accordingly, the conventional driving force transmission mechanism is applied to, for example, an image forming apparatus, in which paper can be fed.

SUMMARY OF THE INVENTION

A driving force transmission mechanism according to the invention comprises a plate through which a reference hole is pierced, a driven shaft vertically standing with respect to a first surface on the first side surface of the plate, a driven structure pivotally provided around the driven shaft, a bracket fixed to the plate so as to cover the reference hole on the first side surface of the plate, and a motor protruding a motor shaft toward the reference hole, being fixed to the bracket. The motor shaft is positioned through the reference hole with driving teeth formed at the motor shaft to be directly engaged with the driven structure or with a driving gear fixed coaxially to the motor shaft to be indirectly engaged with the driven structure.

BRIEF DESCRIPTION OF THE DRAWINGS

Hereinafter, an embodiment in which the invention is embodied will be explained with reference to the drawings.

DETAILED DESCRIPTION OF THE PREFERRED EMBODIMENTS

In a driving force transmission mechanism having a driven shaft and a driven structure at a first side surface of a plate, and a motor at the other surface side of the plate, the motor can be directly fixed to the plate, therefore, positioning between the driven shaft and the driven structure and a motor shaft of the motor is relatively simple. However, in this driving force transmission mechanism, the thickness will be an additional value of the height of the driven structure, the thickness of the plate and the height of the motor, which is large, therefore, it is difficult to secure a space to be housed in an image forming apparatus and the like. Particularly, when a driven gear as a driven structure includes teeth for transmitting driving force in addition to teeth for receiving driving force, the driven gear will be one which is long in the axial direction, therefore, the tendency increases.

On the other hand, in a driving force transmission mechanism having a driven shaft, a driven structure and a motor at a first side surface of a plate, the thickness will be an additional value of the thickness of the plate and either one of the height of the driven structure or the height of the motor which is higher than the other, which is smaller than the above driving force transmission mechanism, as a result, it is easy to secure a space to be housed in the image forming apparatus and the like.

However, in the driving force transmission mechanism, it is difficult to drive the driven structure by the motor shaft of a commercially manufactured motor if the motor is allowed to divide the motor from the first side surface by a bracket. In this case, positioning between the driven shaft and the driven structure, and the motor shaft of the motor is performed through the plate and the bracket, therefore, the positioning will be difficult. When the positioning is insufficient, deterioration of transmission efficiency will occur.

The invention has been made in view of the above circumstances, and an object thereof is to provide a driving force transmission mechanism capable of reducing the thickness as well as easily positioning the driven shaft, the driven structure, and the motor shaft of the motor.

Embodiment 1

Figure 1:
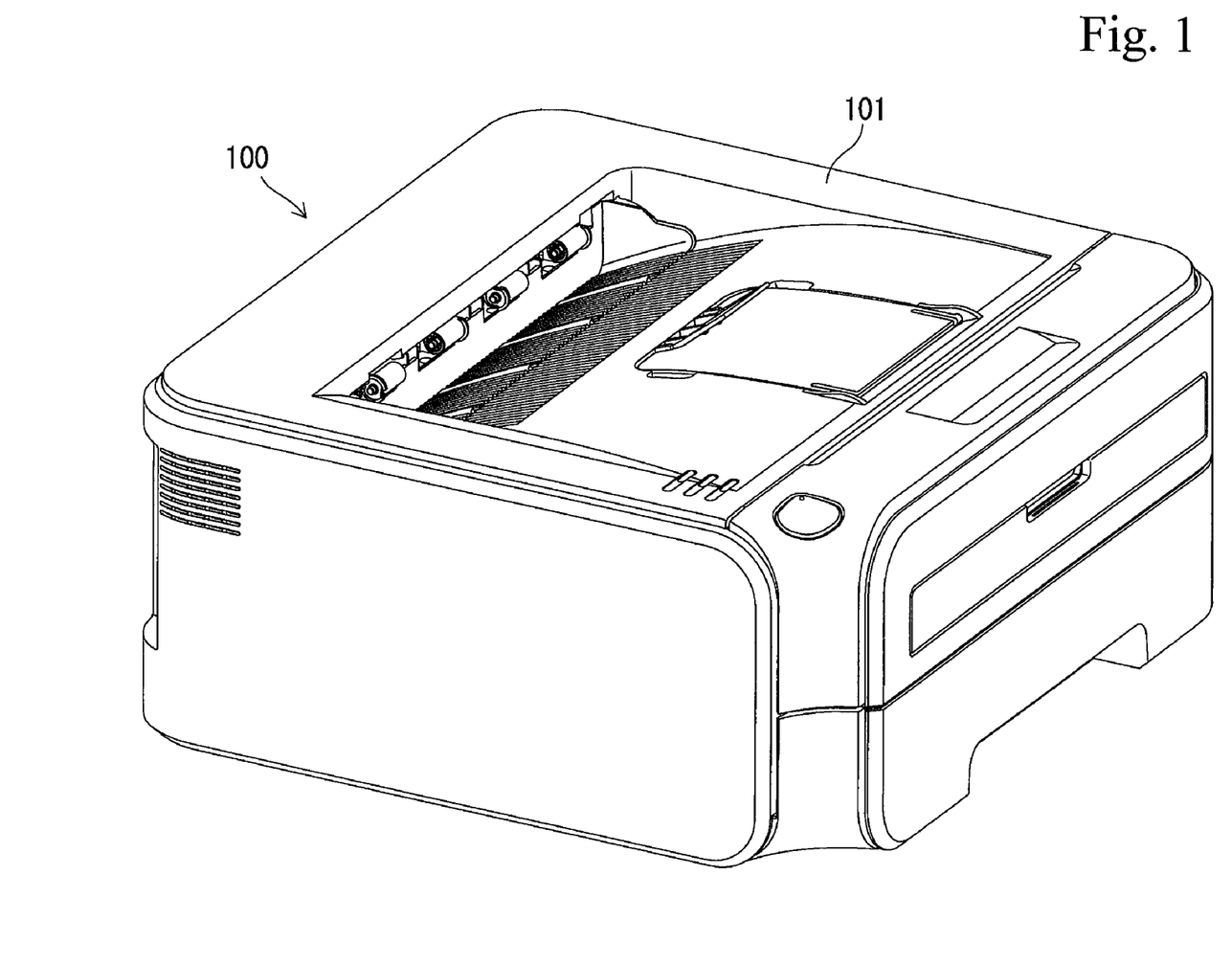
FIG. 1 is a perspective view of a printer of an embodiment.
Figure 2:
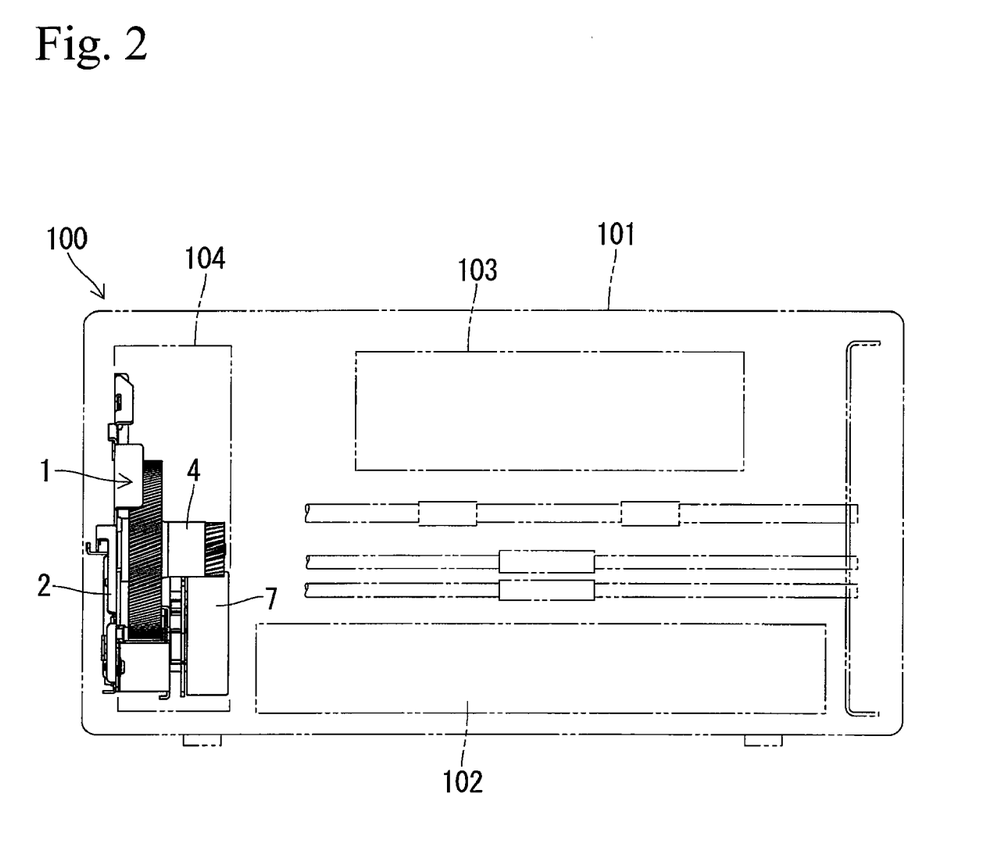
FIG. 2 is a schematic cross-sectional view of the printer of the embodiment.

A driving force transmission mechanism 1 of an embodiment is applied to a printer 100 as an image forming apparatus shown in FIG. 1 and FIG. 2. As shown in FIG. 2, the printer 100 includes a casing 101 having an approximately rectangular parallelepiped shape, a paper feeding means 102 installed in the casing 101, an image forming means 103 forming images on papers fed by the paper feeding means 102 and a driving means 104 driving the image forming means 103. The driving means 104 applies the driving force transmission mechanism 1.

Figure 3:
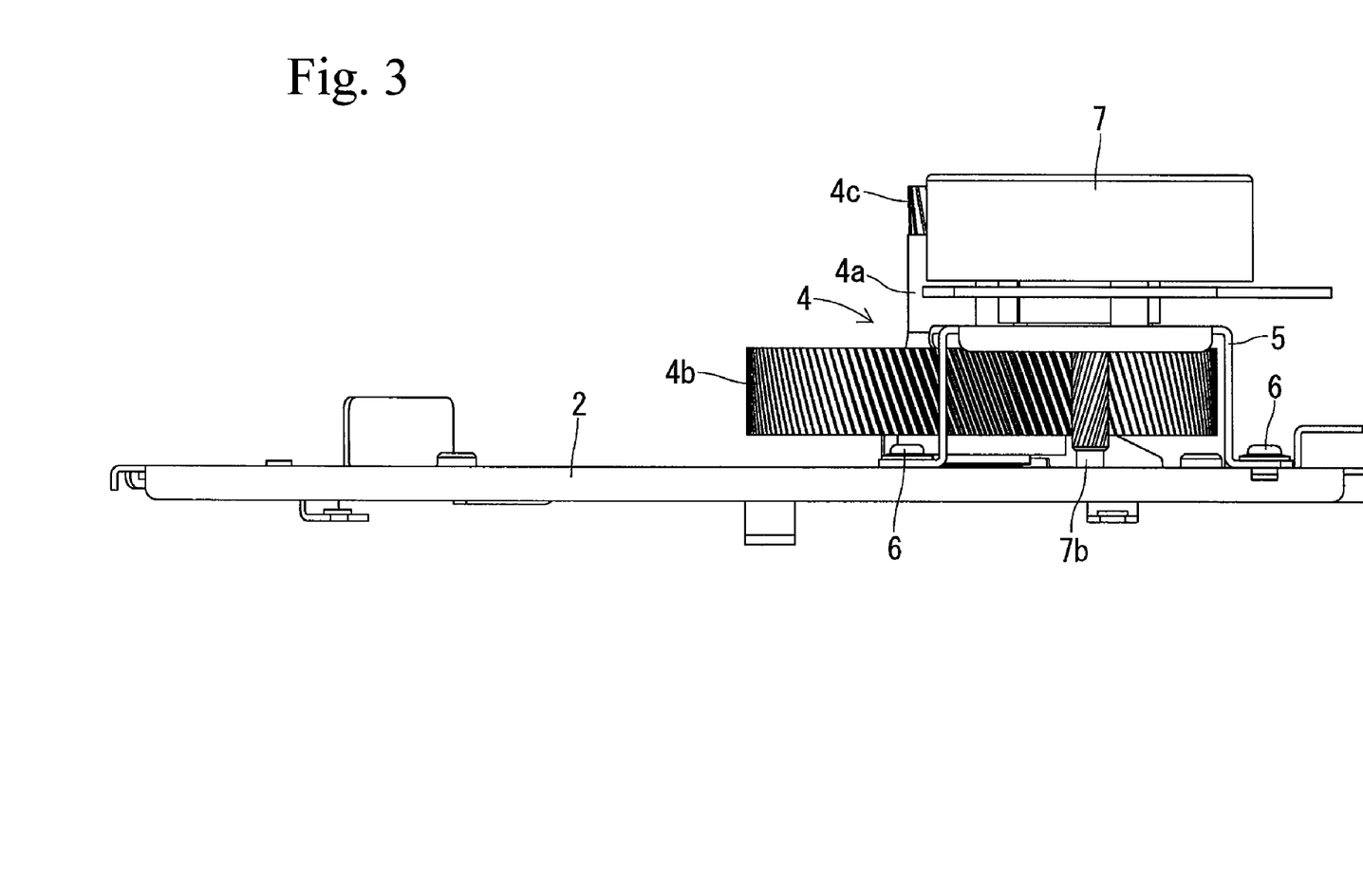
FIG. 3 is a side view of a driving force transmission mechanism of an embodiment.
Figure 5:
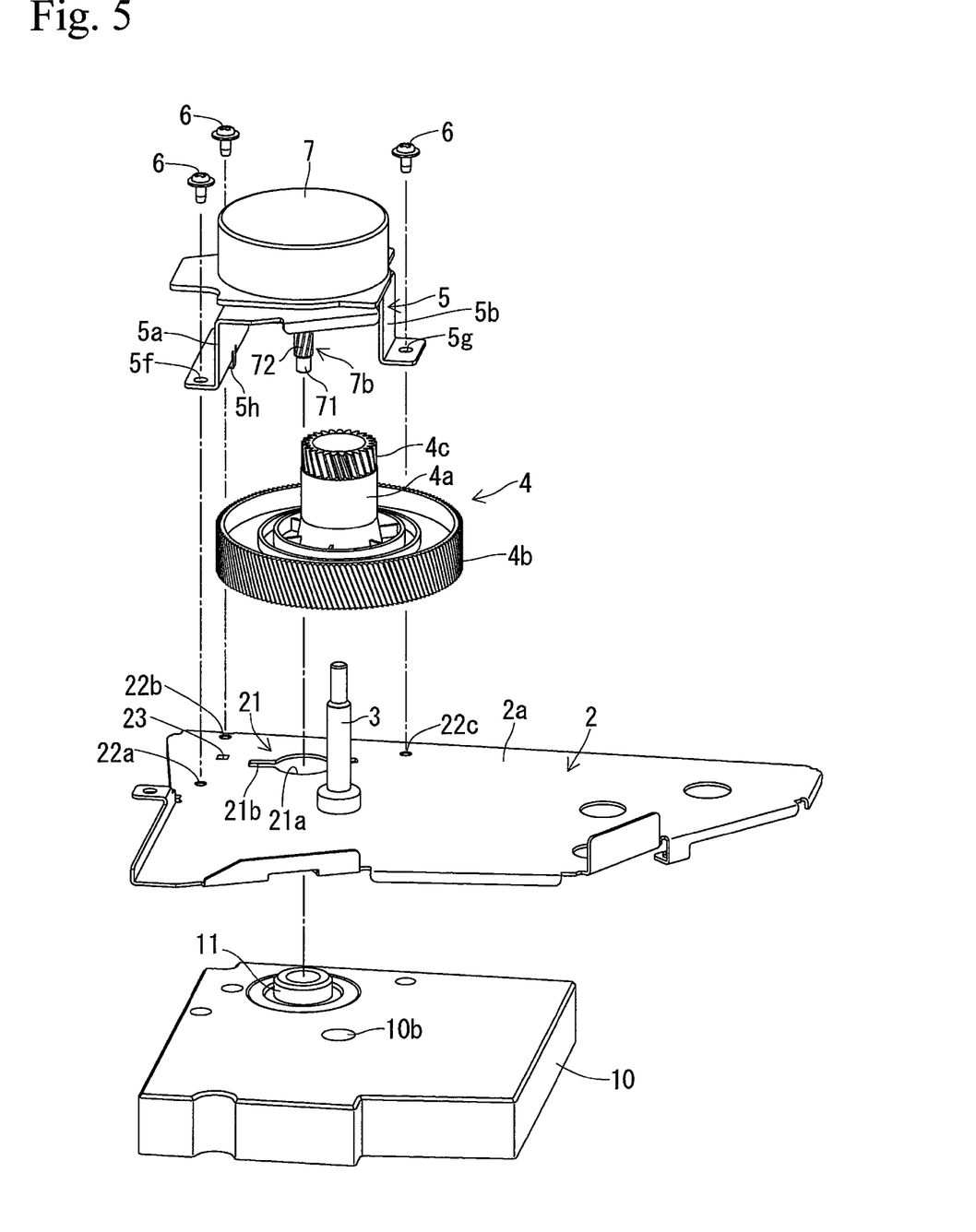
FIG. 5 is a perspective view showing a method of assembling the driving force transmission mechanism of the embodiment.
Figure 7:
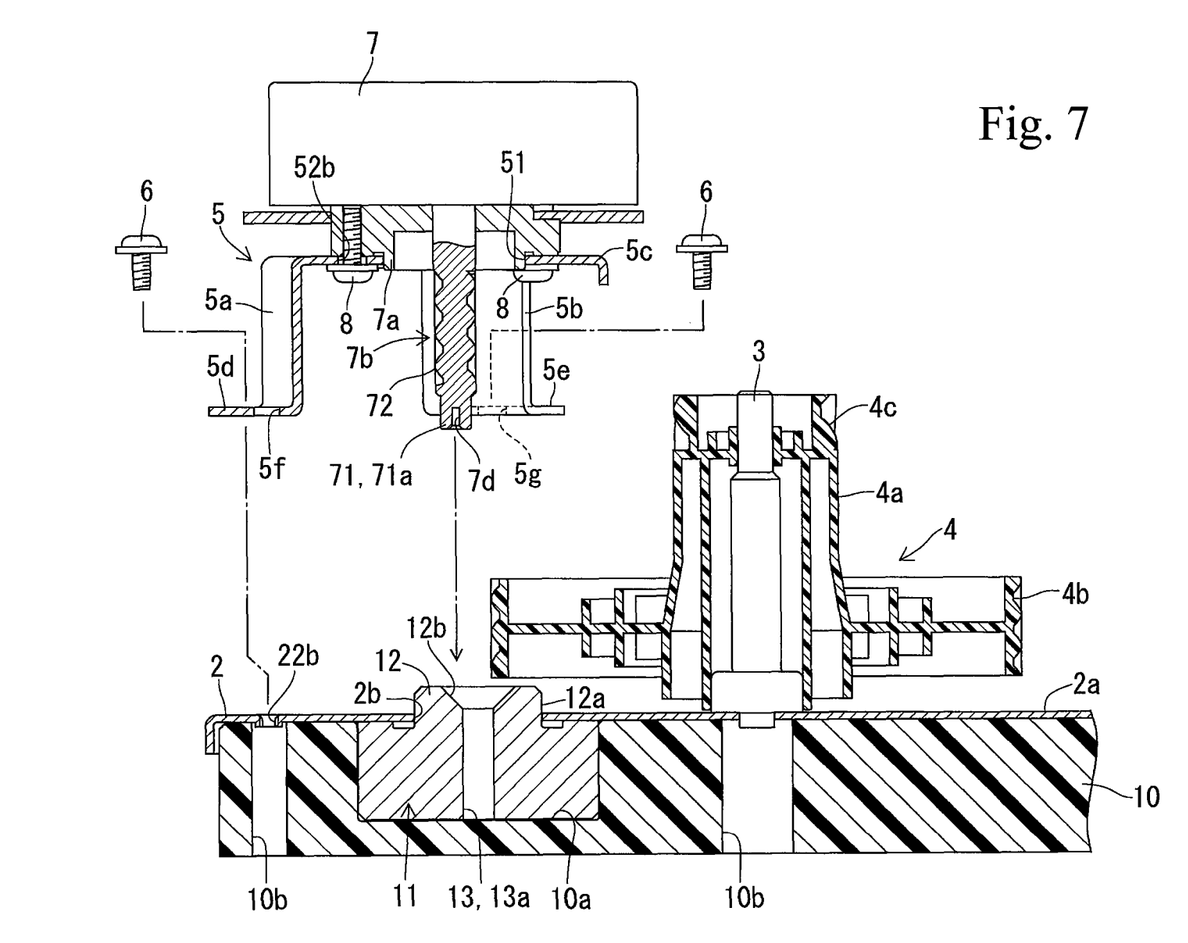
FIG. 7 is cross-sectional view showing a method of assembling the driving force transmission mechanism of the embodiment.
Figure 8:
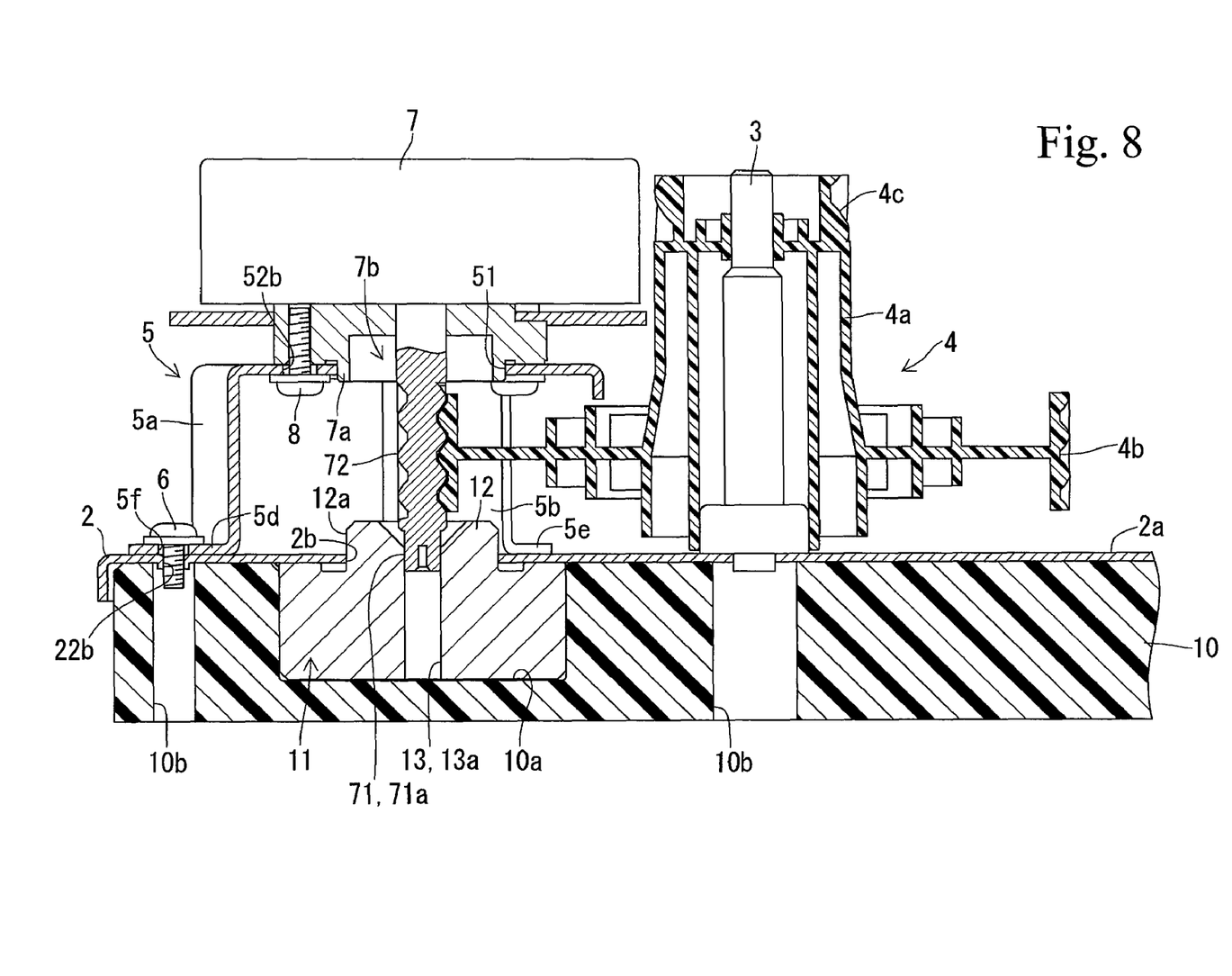
FIG. 8 is a cross-sectional view showing a driving force transmission mechanism after assembly, relating to the driving force transmission mechanism of the embodiment.

As shown in FIG. 3, the driving force transmission mechanism 1 includes a plate 2 having an approximately plate shape. A reference hole 21 is pierced through the plate 2 as shown in FIG. 5. The reference hole 21 includes a circular portion 21a having a circular shape in plan view of the plate 2 and a cut-out portion 21b formed extending in the direction apart from two points of the circumferential edge of the circular portion 21a. The circular portion 21a has an inside diameter larger than an outside diameter of a later-described motor shaft 7b. A circumferential surface of the circular portion 21a is a guide surface 2b having a cylindrical shape which is perpendicular to an inner surface 2a (upper surface in the drawing) of the plate 2 as shown in FIG. 7 and FIG. 8. Three screw holes 22a to 22c are pierced in the vicinity of the reference hole 21 of the plate 2 as well as a locking hole 23 is provided between the screw holes 22a and 22b as shown in FIG. 5. Screws 6 which are described later are screwed in the screw holes 22a to 22c.

As shown in FIG. 5 to FIG. 8, a driven shaft 3 extending perpendicular to the inner surface 2a stands on the side of the inner surface 2a of the plate 2. The driven shaft 3 is fixed to the plate 2 with high accuracy within tolerance.

A driven gear 4 as a driven structure is pivotally mounded around the driven shaft 3. The driven gear 4 is an integral molded product formed by thermoplastic resin such as nylon resin, POM resin or other resin being injection-molded. The driven gear 4 includes a cylindrical shaft portion 4a extending in the axial direction, first teeth 4b formed large in diameter at one end of the shaft portion 4a which is the side of the plate 2 and second teeth 4c formed small in diameter at the other end of the shaft portion 4a which is apart from the first teeth 4b. The first teeth 4b receive the driving force and the second teeth 4c transmit the driving force. Therefore, the driven gear 4 has a long shape in the axial direction.

As shown in FIG. 3 and FIG. 5 to FIG. 8, a bracket 5 is fixed on the side of the inner surface 2a of the plate 2 so as to cover the reference hole 21 by the suitable number of screws 6. The bracket 5 includes a pair of leg portions 5a, 5b vertically standing from the inner surface 2a of the plate 2, being fixed to the plate 2, and a pedestal portion 5c integrally formed with the both leg portions 5a, 5b, extending in parallel with the inner surface 2a. The both leg portions 5a, 5b are positioned at two regions which are 180 degrees opposite to each other with respect to the later-described motor shaft 7b in plan view. The height of the driven gear 4 from the inner surface 2a of the plate 2 is higher than the height of the bracket 5 from the inner surface 2a of the plate 2 to the pedestal portion 5c.

Figure 4:
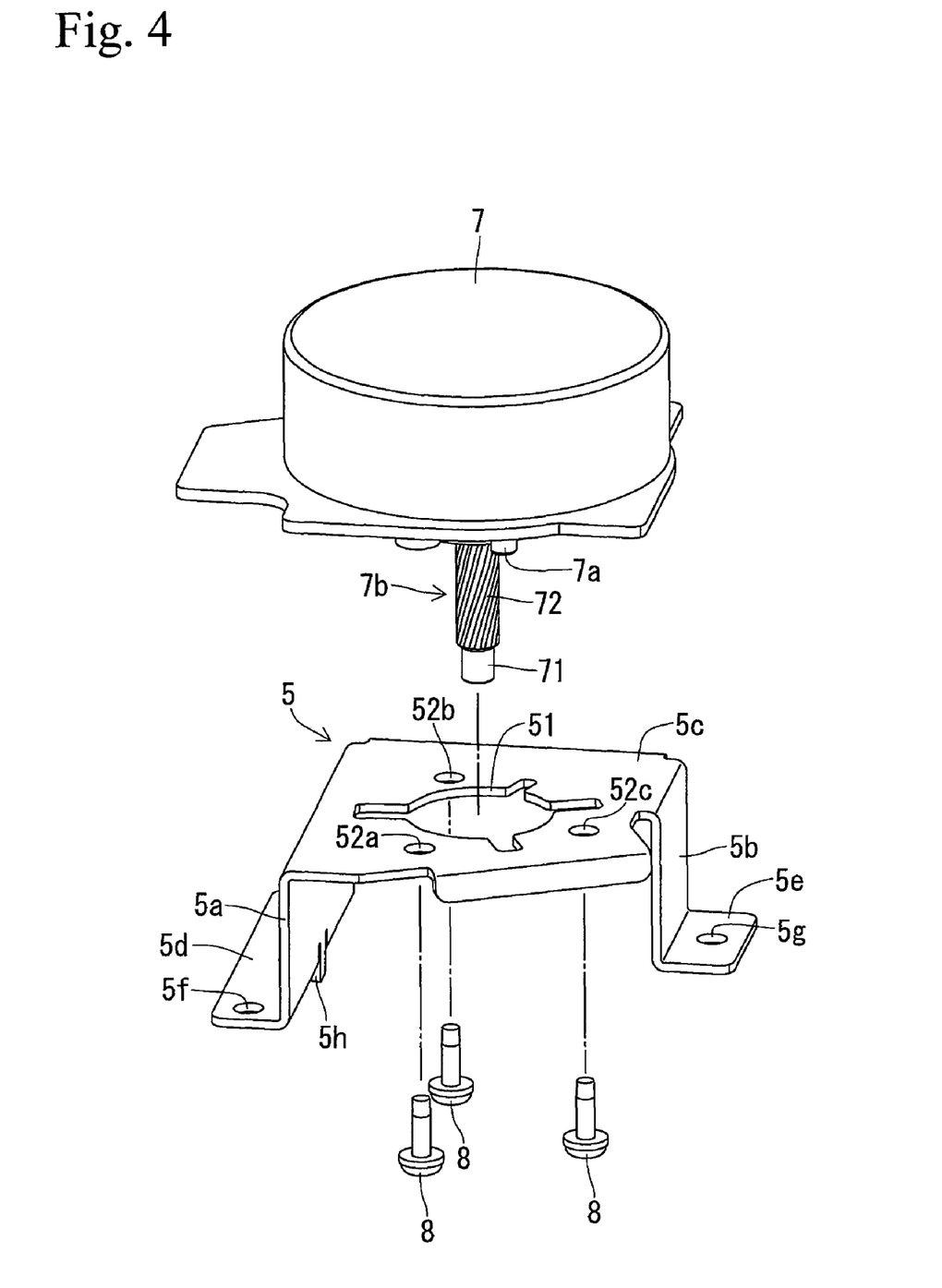
FIG. 4 is an exploded perspective view of a motor and a bracket, relating to the driving force transmission mechanism of the embodiment.

As shown in FIG. 4, flange portions 5d, 5e extending in parallel with the inner surface 2a in the direction apart from each other are formed at lower ends of the both leg portions 5a, 5b of the bracket 5. Two screw holes 5f (only one of them is shown) are pierced at one flange portion 5d, and a screw hole 5g is pierced at the other flange portion 5e. The respective screw holes 5f, 5g are formed rather larger in diameter than the shaft of the screws 6. A protrusion 5h protruding downward is formed at one flange potion 5d. The protrusion 5h forms temporary locking means with the locking hole 23 of the plate 2.

A positioning hole 51 is formed at the pedestal portion 5c of the bracket 5 and three screw holes 52a to 52c are pierced around the positioning hole 51. A protrusion 7a to be matched with the positioning hole 51 is formed at a stepping motor 7 as a motor. The protrusion 7a is inserted to the positioning hole 51 and screws 8 are inserted into the screw holes 52a to 52c to be screwed in the stepping motor 7, as a consequence, the stepping motor 7 is fixed to the bracket 5 with high accuracy within tolerance.

As shown in FIG. 8, the motor shaft 7b of the stepping motor 7 extends towards the reference hole 21 of the plate 2, a tip of which is positioned in the reference hole 21. A positioning portion 71 whose whole circumference is a cylindrical guided surface 71a at the tip of the motor shaft 7b, and driving teeth 72 are formed near the base end side with respect to the positioning portion 71. In the driving force transmission mechanism 1 of the embodiment which has the above structure, the motor shaft 7b is positioned through the reference hole 21 while the driving teeth 72 are directly engaged with the first teeth 4b of the driven gear 4.

The driving force transmission mechanism 1 is assembled as described below. First, as shown in FIG. 5, the plate 2, the stepping motor 7 and the bracket 5 are prepared. In the plate 2, the reference hole 21 is pierced as well as the driven shaft 3 which is perpendicular to the inner surface 2a stands on the side of the inner surface 2a as described above. The stepping motor 7 is fixed on the bracket 5.

A base 10 and a guide member 11 are prepared. The base 10 and the guide member 11 are positioning jigs. As shown in FIG. 7, the base 10 has a flat plate shape, which is kept in a horizontal position. A recessed portion 10a which can house the guide member 11 in a position not displaced is formed on the base 10. The recessed portion 10a does not limit the guide member 11 in the circumferential direction. Some escapes 10b for escaping a lower end portion of the driven shaft 3, protruding portions of the screw holes 22a to 22c and the like are pierced in the base 10, which protrude downward at the plate 2 in a state in which the plate 2 is horizontally placed on the upper surface of the base 10.

The guide member 11 includes a protrusion 12 vertically protruding upward in a state being housed in a recessed portion 10a. A portion other than the protrusion 12 of the guide member 11 does not interfere with the plate 2 placed on the base 10. The protrusion 12 has a columnar shape and a shaft hole 13 vertically extending is formed there inside. An outer circumferential surface of the protrusion 12 is a guided surface 12a to be matched with the guide surface 2b of the reference hole 21, and an inner circumferential surface of the shaft hole 13 is a guide surface 13a to be matched with the guided surface 71a of the positioning portion 71 in the motor shaft 7b. At a tip side of the protrusion 12, a tapered surface 12b which is coaxial with the shaft hole 13 and opening outward is formed.

The plate 2 is placed on the upper surface of the base 10 in a state in which the guide member 11 is housed in the recessed portion 10a of the base 10. At this time, the protrusion 12 of the guide member 11 is matched with the reference hole 21 of the plate 2. Accordingly, the guide surface 2b of the reference hole 21 and the guided surface 12a of the guide member 11 are coaxial with high accuracy within tolerance. In addition, the guided surface 12a of the protrusion 12 is formed on the whole circumference, therefore, the guide member 11 has no directionality constraint with respect to the plate 2 in the circumferential direction. Next, the driven gear 4 is fit to the driven shaft 3.

Figure 6:
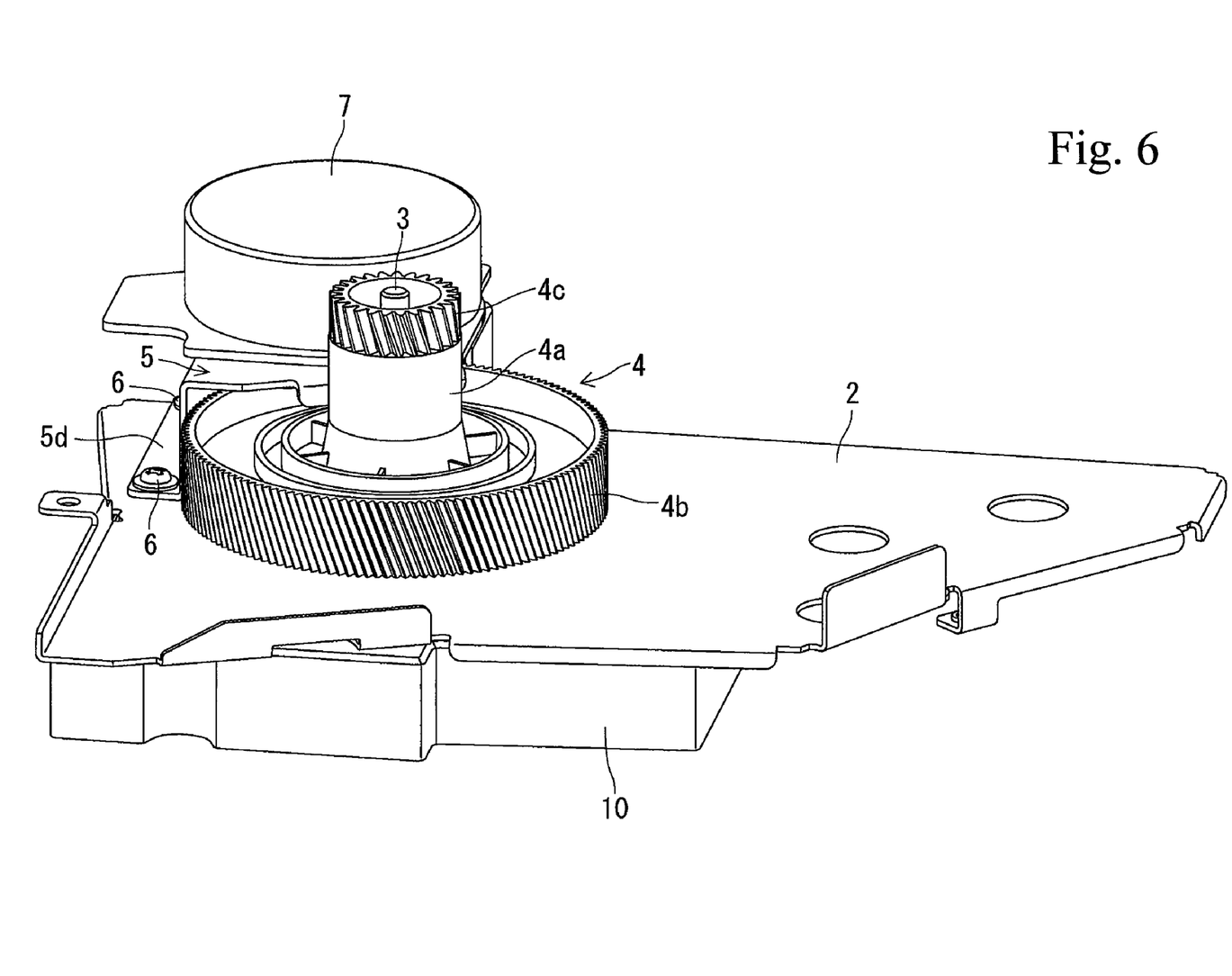
FIG. 6 is a perspective view showing the driving force transmission mechanism after assembly, relating to the driving force transmission mechanism of the embodiment.

After that, as shown in FIG. 6 and FIG. 8, the stepping motor 7 is allowed to be move downward with the bracket 5, and the positioning portion 71 of the tip of the motor shaft 7b is inserted to the shaft hole 13 of the guide member 11. At this time, the tapered surface 12b of the guide member 11 suitably guides the positioning portion 71 of the motor shaft 7b into the shaft hole 13. The driving teeth 72 of the motor shaft 7b are formed near the base end side with respect to the positioning portion 71, therefore, the positioning by the positioning portion 71 will not be impaired. In addition, the guide surface 13a of the shaft hole 13 and the guided surface 71a of the motor shaft 7b are formed over the whole circumference, therefore, the guide member 11 and the motor shaft 7b have no directionality constraint in the circumferential direction.

The positioning portion 71 is formed at a position overlapping with the plate 2, and overlaps with the guide surface 13a there. Accordingly, the motor shaft 7b is positioned with high accuracy at the position of the plate 2 which is the reference for the positioning accuracy.

The protrusion 5h of the bracket 5 is temporarily locked at the locking hole 23 of the plate 2. Next, since respective screw holes 5f, 5g of the bracket 5 are formed rather larger in diameter than the shafts of the screws 6, position adjustment of the bracket 5 with respect to the plate 2 is performed. At this time, the bracket 5 has leg portions 5a, 5b positioned at two regions which are 180 degrees opposite to each other with respect to the motor shaft 7b in plan view, therefore, unfavorable rotation of the bracket 5 is efficiently inhibited.

Accordingly, the guide surface 13a of the guide member 11 and the guided surface 71a of the positioning portion 71 of the motor shaft 7b will be coaxial with high accuracy within tolerance. At this time, the height of the driven gear 4 from the inner surface 2a of the plate 2 may be higher than the height of the bracket 5 from the inner surface 2a of the plate 2 to the pedestal portion 5c. In addition, the reference hole 21 has a lager inside diameter than the outside diameter of the motor shaft 7b and the motor shaft 7b extends in the reference hole 21, therefore, deterioration of the positioning accuracy due to the slant of the guide member 11 is prevented. In this state, the screws 6 are screwed in the screw holes 22a to 22c through respective screw holes 5f, 5g to lock the plate 2 and the bracket 5 permanently.

As described above, the stepping motor 7 is easily positioned on the plate 2 through the bracket 5 to be easily fixed thereto. Then, the driving force transmission mechanism 1 is removed from the base 10 and the guide member 11 and a next plate 2 is placed on the base 10. Accordingly, it is not necessary to provide a member for positioning at every product, which reduces product costs.

The obtained driving force transmission mechanism 1 is provided with the driven shaft 3, the driven gear 4 and the stepping motor 7 at the side of the inner surface 2a of the plate 2 as shown in FIG. 3, having rather small thickness. Therefore, the driving force transmission mechanism 1 can secure a space to be housed in a printer 100 relatively easily as shown in FIG. 2. In other words, since the printer 100 applies the thin driving force transmission mechanism 1 of the embodiment, the miniaturization of the printer 100 can be realized. In addition, the driving force transmission mechanism 1 is arranged so that the stepping motor 7 is disposed at the side of the image forming device 103 with respect to the plate 2, therefore, dead space is hardly generated at an outer surface of the plate 2 in the printer 100, which realizes miniaturization of the printer 100 also by this point.

Therefore, it is possible that the driving force transmission mechanism 1 performs positioning between the driven shaft 3 and the driven gear 4, and the motor shaft 7b of the stepping motor 7 easily, which maintains high transmission efficiency while realizing reduction of production costs because labor for positioning can be saved.

In the driving force transmission mechanism 1, the motor shaft 7b can directly drive the driven gear 4, therefore, the driven gear 4 can be driven with high accuracy. In addition, a driving gear to be fit to the motor shaft 7b can be saved, therefore, the reduction of the number of components can be realized.

In other words, according to the driving force transmission mechanism 1, a small-sized printer 100 with excellent performance can be manufactured relatively easily and at low costs.

In the above description, the invention have been explained in line with the embodiment, however, the invention is not limited to the above embodiment and it goes without saying that the invention can be applied by suitably changing in a scope not departing the gist thereof.

For example, in the invention, it is preferable that a driving gear is coaxially fixed to the motor shaft and engaged to a driven gear and a driven belt indirectly. It is also preferable that the driving force transmission mechanism of the invention is applied to a paper feeding means of the image forming apparatus.

Even when the driving teeth 72 are formed over the whole motor shaft 7b, it is possible that an outline portion of the driving teeth 72 is allowed to contact on the guide surface 13a of the guide member 11 to position the motor shaft 7b. Additionally, as shown in FIG. 7, the motor shaft 7b can be positioned by using a hole 7d formed at a tip of the motor shaft 7b. Moreover, even when the motor shaft 7b does not extend into the reference hole 21, that is, the motor shaft 7b is not formed to have the length exceeding the plate 2, it is possible to perform positioning of the motor shaft 7b by extending the protrusion 12 of the guide member 11 upward.

The driven structure may be a driven gear or a driven belt. The positional relationship between the reference hole and the motor shaft may be coaxial or may be eccentric and displaced in the constant relationship. As the positioning jig, a jig allowing the motor shaft to be positioned in the constant relationship with respect to the driven shaft at a higher position than the position of the reference hole, in addition to the jig allowing the motor shaft to be positioned in the constant relationship with respect to the driven shaft in the reference hole.

It is not always necessary that the guide surface of the reference hole is formed over the whole circumference, however, it is preferable that the guided surface of the positioning jig is formed over the whole surface. In this case, the positioning jig has no directionality constraint in the circumferential direction with respect to the plate, which makes the assembly easy.

Also, it is not always necessary that the guided surface of the positioning portion in the motor shaft is formed over the whole surface, however, it is preferable that the guide surface of the positioning jig is formed over the whole surface. In this case, the positioning jig has no directionality constraint in the circumferential direction with respect to the motor, which makes the assembly easy.

The invention can be used for the image forming apparatus such as the printer.

What is claimed is:

1. A driving force transmission mechanism, comprising:
   a plate through which a reference hole is pierced, the plate including a first side surface;
   a driven shaft vertically standing with respect to the first side surface of the plate;
   a driven structure pivotally provided around the driven shaft;
   a bracket fixed to the plate so as to cover the reference hole on the first side surface of the plate; and
   a motor including a motor shaft that protrudes toward the reference hole, the motor being fixed to the bracket,
   wherein the driven shaft and the driven structure are not directly connected to the bracket, and
   wherein the motor shaft is positionable through the reference hole and engaged with the driven structure via one of driving teeth formed at the motor shaft and a driving gear fixed coaxially to the motor shaft.

2. The driving force transmission mechanism according to claim 1,
wherein the bracket includes a leg portion vertically standing from the first side surface of the plate, being fixed to the plate so that the position can be adjusted, and a pedestal portion integrally formed with the leg portion, extending in parallel with the first side surface to fix the motor, and
wherein the height of the driven shaft or the driven structure from the first side surface is higher than the height from the first side surface to the pedestal portion.

3. The driving force transmission mechanism according to claim 2,
wherein the driven structure includes a cylindrical shaft portion extending in the axial direction,
first teeth formed large in diameter on one end side of the shaft portion with respect to the plate, the first teeth receiving a driving force; and
second teeth formed small in diameter on the other end side of the shaft portion which is apart from the first teeth, the second teeth transmitting the driving force.

4. The driving force transmission mechanism according to claim 2,
wherein the bracket includes the leg portions positioned at two regions which are 180, degrees opposite to each other with respect to the motor shaft in plan view, and
wherein the respective leg portions are screwed in the plate.

5. The driving force transmission mechanism according to claim 4,
further comprising a temporary locking means for locking the plate and the bracket temporarily at the plate and the bracket.

6. The driving force transmission mechanism according to claim 5,
wherein screw holes in which respective screws are screwed as well as a locking hole are formed in the plate, wherein screw holes having larger diameter than the screws as well as a protrusion to be engaged with the locking hole are formed in the bracket; and
wherein the temporary locking means are the locking hole and the protrusion.

7. The driving force transmission mechanism according to claim 1,
wherein the motor shaft has a positioning portion for performing positioning through the reference hole formed at a tip thereof.

8. The driving force transmission mechanism according to claim 7,
wherein the reference hole includes a cylindrical guide surface which is perpendicular to the first side surface, and
wherein the positioning portion has a cylindrical guided surface extending coaxially with the guide surface.

9. The driving force transmission mechanism according to claim 7,
wherein the motor shaft has the driving teeth formed to be engaged with the driven structure.

10. The driving force transmission mechanism according to claim 9,
wherein the driving teeth are formed on the side of a base end with respect to the positioning portion.

11. The driving force transmission mechanism according to claim 1,
wherein the reference hole has an inside diameter larger than an outside diameter of the motor shaft, and
wherein the motor shaft extends into the reference hole.

12. An image forming apparatus, comprising:
a paper feeding means;
an image forming means for forming images on papers fed by the paper feeding means; and
a driving means for driving the image forming means,
wherein the paper feeding means or the driving means includes the driving force transmission mechanism according to claim 1,
wherein the motor in the driving force transmission mechanism is arranged so as to be arranged on the side of the image forming means with respect to the plate.

13. The driving force transmission mechanism according to claim 1, wherein the driven structure is a driven gear.

14. A driving force transmission mechanism, comprising:
a plate through which a reference hole is pierced, the plate including a first side surface;
a driven shaft vertically standing with respect to the first side surface of the plate;
a driven structure pivotally provided around the driven shaft;
a bracket fixed to the plate so as to cover the reference hole on the first side surface of the plate; and
a motor including a motor shaft that protrudes toward the reference hole, the motor being fixed to the bracket,
wherein the driven shaft and the driven structure are not directly connected to the bracket,
wherein the motor shaft is configured to be positioned through the reference hole via a positioning jig positioned with respect to the plate by the reference hole, the positioning jig being configured to directly position the motor shaft and the driven shaft so that the motor shaft is positioned with the driven shaft in a constant relationship via the positioning jig, and
wherein the motor shaft is configured to engage with the driven structure.

15. The driving force transmission mechanism according to claim 14, wherein the motor shaft engages with the driven structure via driving teeth of the motor shaft.

16. The driving force transmission mechanism according to claim 14, further comprising:
a driving gear fixed coaxially to the motor shaft,
wherein the motor shaft engages with the driven structure via the driving gear.

17. A driving force transmission mechanism, comprising:
a plate through which a reference hole is pierced, the plate including a first side surface;
a driven shaft vertically standing with respect to the first side surface of the plate;
a driven structure pivotally provided around the driven shaft;
a bracket fixed to the plate so as to cover the reference hole on the first side surface of the plate; and
a motor including a motor shaft that protrudes toward the reference hole, the motor being fixed to the bracket,
wherein the driven shaft and the driven structure are not directly connected to the bracket,
wherein the reference hole is engageable with a positioning jig that is configured to position the motor shaft, and
wherein the motor shaft is positionable through the reference hole and engaged with the driven structure via one of driving teeth formed at the motor shaft and a driving gear fixed coaxially to the motor shaft.

* * * * *